(No Model.)
M. H. EATON.
METHOD OF AND MEANS FOR MAKING MOLE DITCHES.
No. 291,313. Patented Jan. 1, 1884.
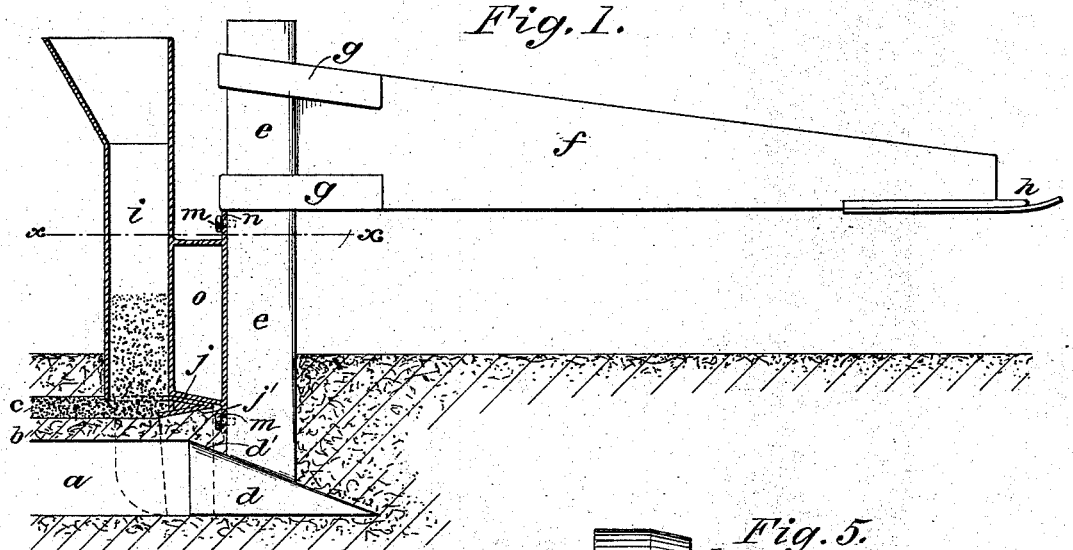
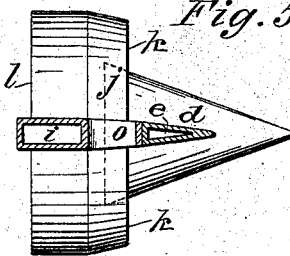
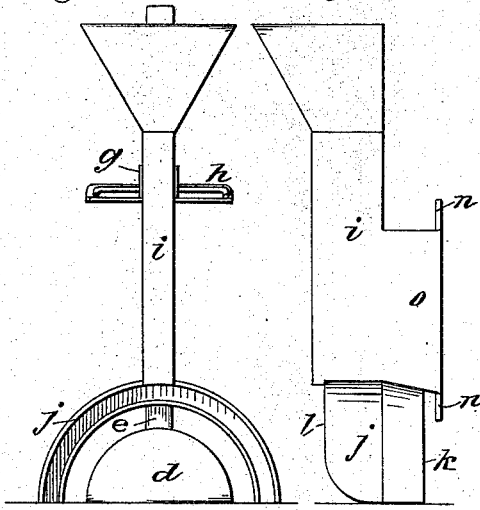
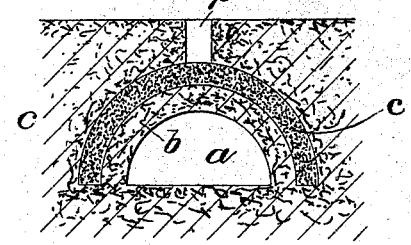
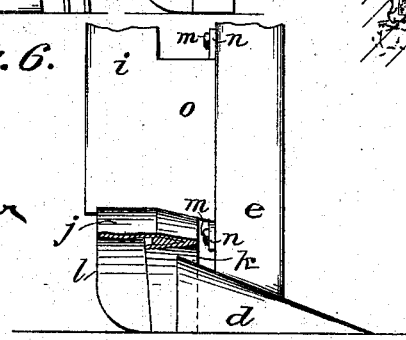
WITNESSES:
INVENTOR:
M. H. Eaton
BY
ATTORNEYS.

United States Patent Office.

MILTON HERBERT EATON, OF WILTON JUNCTION, IOWA.

METHOD OF AND MEANS FOR MAKING MOLE-DITCHES.

SPECIFICATION forming part of Letters Patent No. 291,213, dated January 1, 1884.

Application filed August 13, 1883. (No model.)

*To all whom it may concern:*

Be it known that I, MILTON HERBERT EATON, of Wilton Junction, in the county of Muscatine and State of Iowa, have invented a new and Improved Method of and Means for Making Mole-Ditches, of which the following is a full, clear, and exact description.

The objects of my invention are, first, to cut or form mole-ditches by a new method, and so as to leave a solid cement lining or continuous tile at the top and sides of the ditch, and, secondly, to provide simple, efficient, and easily-operated devices for performing the work.

The invention consists in a method of forming the ditch with a lining of cement applied as the ditching-machine moves along, said cement lining being supported while hardening on a layer or shell of earth formed by a space between the mole-ditching plow and the cutter for forming the cement-lining cavity.

The invention includes, also, novel constructions of the ditching-machine with a plow and cutter for forming the ditch proper and the cement-lining cavity, and with a feed hopper or tube for a continuous supply of cement for lining the ditch.

The invention comprises, also, novel constructions and combinations of parts of the ditching-machine, all as hereinafter fully described and claimed.

Reference is to be had to the accompanying drawings, forming part of this specification, in which similar letters of reference indicate corresponding parts in all the figures.

Figure 1 represents in sectional side view my improved method of and means for making the ditch. Fig. 2 is a cross-section of the ditch as completed by my invention. Fig. 3 is a rear view of the machine. Fig. 4 represents in side elevation my improved attachment to the ordinary mole-ditcher, and as removed therefrom. Fig. 5 is a sectional plan view of the machine on the line $x\,x$, Fig. 1; and Fig. 6 is a side elevation of the lower part of the machine, partly broken away.

My improved method of forming the ditch is shown clearly in Figs. 1 and 2, in which the letter $a$ represents the ditch proper, and as first formed by the mole-ditching plow. The letter $b$ represents the earth lining over the ditch $a$, and $c$ represents the continuous cement roof or arch, which is laid over the earth lining $b$, and preferably in a plastic state, as the machine moves along.

The principal object and novel feature of my method is to provide by the earth lining $b$ for a temporary support to the cement arch or roof $c$ until the cement shall "set" and harden, so as to be self-supporting after the earth lining $b$ shall have been swept away by the water or sewage flow through the ditch.

The means I employ in forming the ditch are shown in Figs. 1, 3, and 4, and consist of an ordinary mole-ditcher having the earth displacing and compressing ditch-forming head $d$, a standard, $e$, sharpened at the front for parting the earth above the head, and any suitable beam, $f$, having connections $g$, of any approved kind, with the standard $e$, and also having a front clevis or eye, $h$, for connection of the draft. Any suitable devices may be provided for governing the depth of working the machine in the ground.

My improvement in the machine consists, essentially, in an attachment to the ditcher-standard $e$, consisting of a cement-feed hopper or tube, $i$, carrying at its lower end the knife or cutter-head $j$, which is sharp at its front edge, $k$, and at its rear edge, $l$, is of a width or thickness corresponding to the desired thickness of the cement lining $c$ of the ditch. The cutter-head $j$ is of like general transverse form with the plow-head $d$, and as much larger than the head at the sides and top as the desired thickness of the temporary earth lining $b$. I connect the hopper $i$ and cutter $j$ to the standard $e$ by bolts $m$, passing through flanges $n$ at the front of any suitable connecting and spacing frame, $o$, which is of like width or thickness with the beam $e$ and the hopper $i$. (See Fig. 5.) The knife or cutter $j$ is preferably secured to hopper $i$ and connection $o$, so that the front edge of the cutter $j$ overlaps somewhat the rear edge of the ditch-plow $d$. The attachment $i\,j$ may thus readily be applied to the ordinary mole-ditch plow, $d\,e\,f$, for working the improved cement arched ditch, or may be removed for forming the ordinary mole-ditch, as desired.

In operation, the machine, adjusted as in Fig. 1, is started in and drawn through the earth. The plow-head $d$ forms the ditch $a$, and the knife or cutter plow $j$ forms the cavity to receive the cement arch or lining $c$, which is fed continuously to the hopper $i$ by any suitable means, as from a wagon drawn alongside of the ditcher, or a platform connected with the ditcher, and the cement drops or flows by its gravity into the opening made by cutter $j$ and over the lining $b$ of earth left by the opening between the plow $d$ and cutter $j$, as above described. The overlap of the forward edge $k$ of the cutter $j$ on or past the rear edge or face of plow $d$, combined with the reverse incline of the inner and outer overlapping faces of the cutter and plow, as at $d'$ $j'$, tends to solidly compress the earth that has been broken up by the passage of the standard $e$ through it, so that the earth lining $b$ shall be unbroken at the top, and sufficiently stable to support the cement lining $c$ above it until the cement shall have become hardened. The opening $p$, made by the passage of the standard $e$ and hopper $i$, may be closed with earth or not, as desired, a special advantage of my method being that any water-flow through said opening will impinge upon the cement $c$, and cannot cause a caving in or destruction of the ditch, now so common.

It is obvious that cement-lined ditches made as above described may have any desired suitable cross-sectional form, instead of the preferred arched-top form shown, and that the ditch, when made, is well calculated for a smooth flow of drainage through it, and is also very durable; and, furthermore, the ditch may be formed rapidly and in any direction or for any length, and at comparatively small expense.

Having thus described my invention, I claim as new and desire to secure by Letters Patent—

1. The improved method of forming mole-ditches herein shown and described, consisting in lining the ditch proper, $a$, with a layer of cement, $c$, supported while hardening on the earth lining or shell $b$, formed over the ditch $a$, substantially as specified.

2. The combination, with the mole-ditcher $d$ $e$, of the cement-feed hopper or tube $i$ and a cutter, $j$, for forming the cement-lining cavity, said cutter $j$ being spaced from the ditcher-plow $d$, between the ditch proper and the cement-cavity, substantially as shown and described.

3. The combination, with the mole-ditcher $d$ $e$, of the hopper $i$ and cutter $j$, said cutter $j$ overlapping the rear end of the ditcher-plow $d$ and the cutter $j$ and plow $d$ having reversely-inclined opposite faces $j'$ $d'$, substantially as shown and described.

4. The combination, with the mole-ditch plow $d$ $e$, of the cement-hopper $i$ and cutter $j$, detachably connected to the ditcher-standard $e$, substantially as shown and described.

MILTON HERBERT EATON.

Witnesses:
THOMAS RAYNER,
H. F. GIESSLER.